United States Patent [19]

Dixon

[11] Patent Number: 5,054,673

[45] Date of Patent: Oct. 8, 1991

[54] VEHICLE SKI CARRIER SYSTEM

[75] Inventor: Michael Dixon, Applecross, Australia

[73] Assignee: Rola Roof Racks International, Inc., Torrance, Calif.

[21] Appl. No.: 495,057

[22] Filed: Mar. 19, 1990

[51] Int. Cl.5 .............................................. B60R 9/00
[52] U.S. Cl. .................... 224/324; 224/323; 224/319; 224/325; 224/917
[58] Field of Search ............... 224/324, 323, 319, 322, 224/321, 317, 325, 917; D12/157

[56] References Cited

U.S. PATENT DOCUMENTS

| D. 300,914 | 5/1989 | Arvidsson | D12/157 |
|---|---|---|---|
| 4,226,351 | 10/1980 | Biermann et al. | 224/324 |
| 4,720,031 | 1/1988 | Zimmerman | 224/323 |
| 4,863,082 | 9/1989 | Evans et al. | 224/917 |
| 4,867,362 | 9/1989 | Finnegan et al. | 224/324 |

FOREIGN PATENT DOCUMENTS

| 2828192 | 1/1979 | Fed. Rep. of Germany | 224/323 |
|---|---|---|---|
| 2835734 | 3/1980 | Fed. Rep. of Germany | 224/917 |
| 3344611 | 6/1985 | Fed. Rep. of Germany | 224/917 |
| 3539288 | 5/1987 | Fed. Rep. of Germany | 224/917 |

Primary Examiner—Ernest G. Cusick
Assistant Examiner—Keith Kupferschmid
Attorney, Agent, or Firm—Pretty, Schroeder, Brueggemann & Clark

[57] ABSTRACT

A vehicle ski carrier system carries a plurality of skis oriented in a position inclined from the vertical. The ski carrier system includes hinged lower and upper arms, and ski carrier inserts attached to each arm. The ski carrier inserts have opposed, alternating flat holding members and curvilinear compression members. When the arms are opened, a pair of skis can be placed against a holding member on the lower arm, and when the arms are closed, an opposing holding member on the upper arm closes on the opposite side of the skis and the opposed holding members are then urged tightly together by the compression members. The ski carrier inserts are of a modular construction.

5 Claims, 2 Drawing Sheets

VEHICLE SKI CARRIER SYSTEM

BACKGROUND OF THE INVENTION

1. Field of the Invention

This invention relates generally to systems for carrying articles on the exterior of vehicles and, more particularly, to surface-mounted carriers for carrying skis.

2. Description of the Related Art

Many articles are most conveniently carried on the outside of a vehicle, typically on its roof. For example, skis are rather long and do not easily fit within the interior carrying space of a vehicle. Furthermore, after they have been used for skiing, the skis become somewhat packed with dirt and melting snow. The dirt and melting snow make it undesirable to carry the skis within the vehicle, even if they would fit. Therefore, most skiers find it best to carry skis by attaching them to a rack mounted on the roof of their vehicle. Placing the skis on the roof rack keeps them out of the vehicle interior and leaves them readily accessible for loading and unloading.

Generally, vehicle ski rack systems comprise two spaced-apart, parallel load bars extending across the roof of the vehicle, a support tower at the end of each load bar for supporting the bars above the vehicle roof, and a ski carrier attached to each load bar. The skis to be carried are oriented longitudinally on the two carriers so as to span the distance between the load bars. The ski carriers include provision for holding the skis to the carrier, and thereby to the roof of the vehicle.

Ski carriers for use with roof racks typically comprise two arms, one fixed arm attached to a load bar and the other arm pivoting onto the fixed arm, the arms attached to each other at one end by a hinge. With the arms opened apart, a ski is placed horizontally on the fixed arm with its top surface facing up, the ski boot bindings on the ski top surface safely oriented away from the vehicle roof. The pivoting arm is then closed down upon and locked to the fixed arm, thereby holding the ski between the arms. When the skis are to be removed, the arms are opened so that the skis can be lifted away.

While such carriers generally hold the skis securely in place and are convenient to use, they also have a somewhat limited carrying capacity. The skis must be placed in the carrier arms laying flat, side by side. It is easily possible for the carrier to be unable to carry the skis of all the vehicle occupants. Some rack support towers provide added clearance between the load bar and the vehicle roof to allow a pair of skis to be placed bottom to bottom and then loaded horizontally in the carrier, one ski facing upward and the other ski facing downward. The added clearance prevents contact between the ski boot bindings of the downward facing ski and the vehicle roof, which would mar the roof, but great care must still be taken to avoid any contact during loading and unloading and the resulting structure creates an undesirably high profile.

Alternative ski carriers for roof racks provide angled carrying of skis in which the skis are inclined somewhat from the horizontal, giving sufficient clearance for the ski boot bindings from the vehicle roof. Such carriers include load arms with a plurality of angled support members on the fixed arm and a corresponding number of rubber securing loops stretched across the pivoting arm. Skis are inclined against the support members and, as the pivoting arm is brought down, the securing loops are stretched across the skis to hold them in place. Such ski racks provide greater carrying capacity without requiring increased clearance between the load bar and roof. This can improve the aerodynamic efficiency of the system. However, use of securing loops is not believed to hold skis as positively and securely as desired. Moreover, because the securing loops are made of rubber, they can lose some of their flexibility in the cold, becoming more brittle and resistant to stretching. This makes loading and unloading more difficult and reduces the life of the loops.

From the discussion above, it should be apparent that there is a need for a vehicle ski carrier system that has a high carrying capacity with improved ability to securely hold skis, while being easy and convenient to use, and remaining so under varying temperature conditions. The present invention satisfies this need.

SUMMARY OF THE INVENTION

Briefly, and in general terms, the present invention provides a novel ski carrier system for carrying a plurality of skis on the roof of a vehicle utilizing a carrier frame having cooperating holding members and compression members that positively and securely hold skis in place, yet is easy and convenient to use. Moreover, the holding members and compression members embody a modular construction allowing great flexibility in configuring the ski carrier system for carrying various numbers of skis. In addition, the holding and compression members are constructed of a material that does not lose its resiliency in cold temperatures.

More specifically, in a presently preferred embodiment, the carrier system includes upper and lower arms joined at their one ends by a hinged connection and at their opposite ends by a locking mechanism to form the carrier frame. The holding members and compression members are inserts having alternating flat and curvilinear segments, respectively. The holding members are arranged in opposed pairs for receiving and gripping the opposite surfaces of a pair of skis inserted between them, and a compression member generally associated with each holding member urges the opposed holding members tightly towards each other when the upper and lower arms are closed and locked together. Each half of a holding member pair and its associated compression member is joined to one of the arms so that the holding member pairs separate as the upper arm is unlocked and opened, permitting easy loading and unloading of the skis from the carrier system.

The inserts are preferably constructed of neoprene, a material that will not lose its flexibility in cold temperatures and has a resiliency that allows it to return to its original shape after compression. The inserts are preferably provided in a modular configuration, such that inserts can be attached to the arms in configurations of varying carrying capacities.

Other features and advantages of the present invention should be apparent from the following description of the preferred embodiment, which illustrates, by way of example, the principles of the invention.

DESCRIPTION OF THE PREFERRED EMBODIMENT

Figure 1:
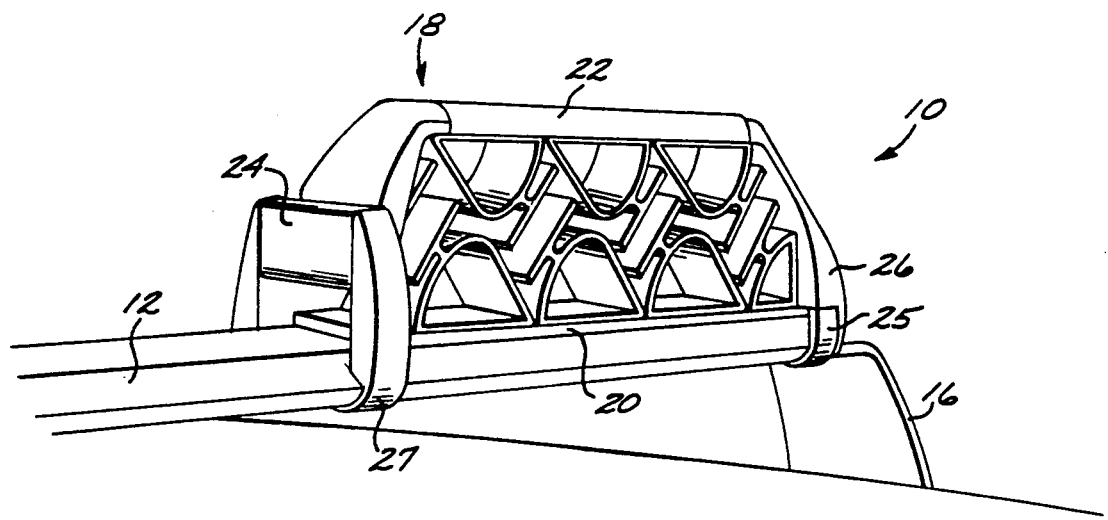
FIG. 1 illustrates a vehicle ski carrier system in accordance with the present invention with a capacity for carrying four pairs of skis.

Referring now to the drawings, and particularly to FIG. 1 thereof, there is shown a vehicle roof-mounted rack, indicated generally by reference numeral 10, on which a ski carrier system in accordance with the present invention is mounted. The roof rack includes a load bar 12 extending laterally across the roof 14 of the vehicle, supported above the roof by a support tower 16. A ski carrier, indicated generally by reference numeral 18, is attached to the load bar 12. While only one support tower 16 is illustrated, it is to be understood that a similar support tower is located at the opposite end of the load bar 12. Similarly, while only a single load bar 12 and ski carrier 18 are illustrated, it is to be understood that the ski rack system includes an additional load bar, ski carrier, and support towers displaced longitudinally along the vehicle roof that duplicate the structure shown in FIG. 1.

The ski carrier 18 illustrated in FIG. 1 includes a lower arm 20 clamped in conventional manner to the load bar 12 by end clamps 25, 27 and an upper arm 22 that is attached to the lower arm at one end by a hinge assembly 24. The opposite end of the arms includes a locking assembly 26 for locking the arms together in the closed position, thereby preventing them from inadvertent opening, as well as providing security against theft of the ski carrier and any skis held therein.

Figure 3:
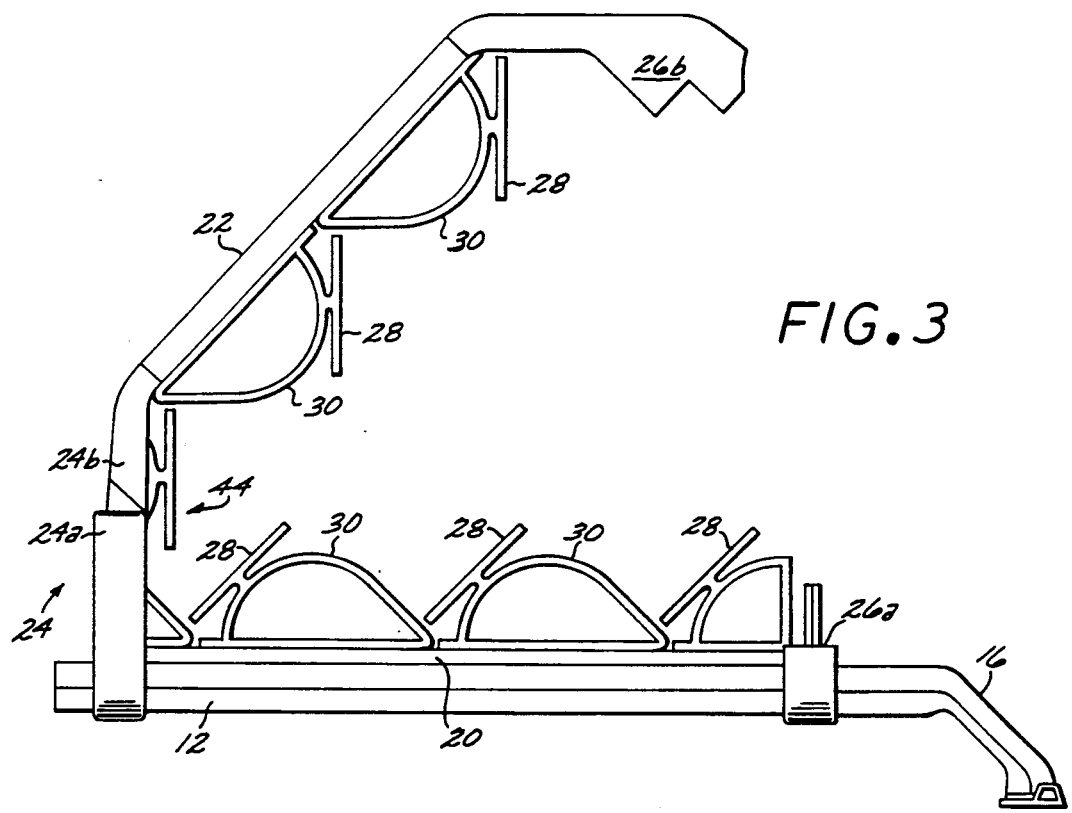
FIG. 3 illustrates the ski carrier system of FIG. 2 in the open condition.
Figure 2:
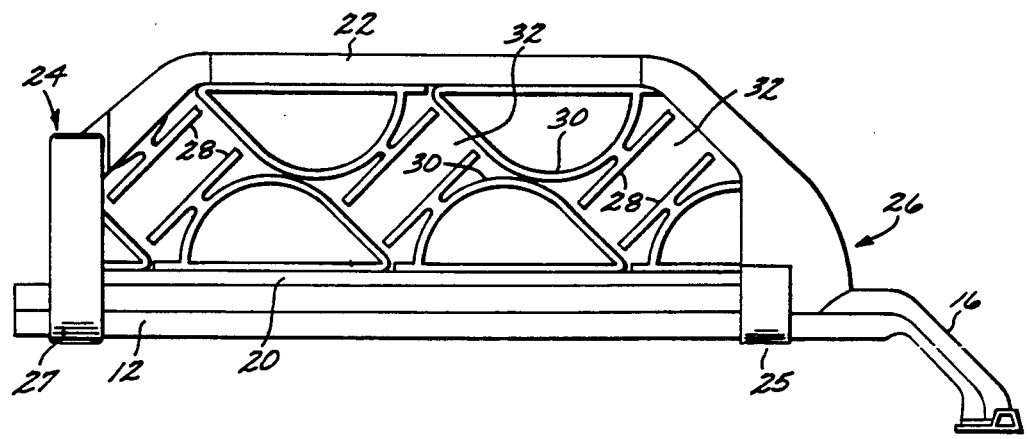
FIG. 2 illustrates a ski carrier system in accordance with the present invention in the closed condition, the system having a carrying capacity of three pairs of skis.

Turning now to FIGS. 2 and 3, it can be seen more clearly that the arms 20 and 22, together with the hinge assembly 24 and the locking assembly 26, define a carrier frame within which a number of generally flat holding members 28 and curvilinear compression members 30 are mounted. The holding members 28 are paired to define a space 32 into which a pair of skis are to be received and gripped. The width of space 32 is selected to be somewhat smaller than the combined thickness of a typical pair of skis, so that when the skis are received between the opposed holding members 28, the compression members 30 associated with one or both of those holding members will urge them together to ensure that the skis are securely held in place. The carrier 18 illustrated in FIG. 1 has four opposed pairs of holding members 28, and therefore the ski carrier has a capacity for carrying four pairs of skis, while the system of FIGS. 2 and 3 holds three pairs of skis.

It can be seen that the holding members 28 generally are attached to the compression members 30 so that the holding members are inclined approximately 45° from vertical, and adjacent pairs of holding members are separate by two compression members. The rack system illustrated in FIGS. 2 and 3, having a different carrying capacity from that illustrated in FIG. 1, has a smaller number of holding members and compression members than that shown in FIG. 1. It also has a lower arm 20 and upper arm 22 of correspondingly shorter length than the arms illustrated in FIG. 1.

Referring to FIG. 3, the hinge assembly 24 includes a lower hinge member 24a and an upper hinge member 24b, which are identical to the corresponding elements shown in FIG. 1. The hinge assembly is independent of the system's carrying capacity. Likewise, the locking assembly 26 is comprised of a lower locking member 26a and an upper locking member 26b, identical to corresponding elements shown in FIG. 1. It, too, is independent of the system's carrying capacity. Both the hinge assembly 24 and the locking assembly 26 can be of conventional construction well known in the art. The lower members 24a, 26a and upper members 24b, 26b are pressed into their respective arms and held there by a snap fit construction.

In FIG. 3 the carrier is in the open position, which illustrates that the lower half of the holding members 28 and their associated compression members 30 are attached to the lower arm 20, and the upper half of the holding members and their associated compression members are attached to the upper arm 22. Each half is comprised of a repeating structure with alternating flat holding members 28 and curvilinear compression members 30. In particular, it will be seen that each flat holding member 28 connects at its midpoint to a curvilinear compression member, and that one end of the holding member extends nearly to an adjacent curvilinear compression member. In the closed position (FIG. 2), the other end of the holding members extends nearly to the adjacent compression member on the other side. The result is that the ski-holding space 32 is closed on all sides in virtually box-like fashion.

When the arms 20, 22 are in the open position of FIG. 3, a pair of skis laid bottom-to-bottom may be cradled with one top surface laid upon a holding member 28 attached to the lower arm 20, and the edges of the skis then rest against an adjacent compression member 30. When the arms are brought together, the holding member 28 attached to the upper arm 22 will close against the opposite top surface of the pair of skis. Since opposed holding members are spaced apart a distance slightly less than the combined thickness of a typical pair of skis, the compression members associated with those holding members will tend to urge the holding members together to hold the skis tightly in place.

The flat holding members and the curvilinear compression members are preferably formed integrally of neoprene, a material that will not lose its flexibility in cold temperatures and has a resiliency that allows it to return to its original shape after deformation. That is, the neoprene has a memory that tends to resist compression. The arms 20, 22, hinge assembly 24 and locking assembly 26 all can be formed of aluminum suitably coated for corrosion resistance.

Figure 4:
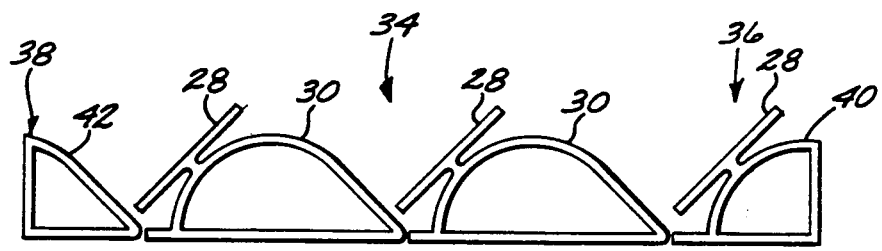
FIG. 4 illustrates the modular construction of the ski carrier system of FIGS. 2 and 3.

The repeating structure of the holding members 28 and compression members 30 lends itself to a modular construction which can be installed as inserts in the carrier frame. This modular construction is illustrated in FIG. 4, which shows the lower half of the holding members 28 and compression members 30 illustrated in FIG. 3 in their various component parts. The inserts comprise a central carrying module 34, which can be integrally formed as a single unit or, alternatively, as a series of separate holding member-compression member units, and two end modules 36 and 38. The end modules are necessary to complete the repeating pattern of the holding members and the compression members and fill out the space within the carrier frame. One end module 36 comprises a flat holding member 28 and approximately one-half of a curvilinear compression member 40. The other end module 38 comprises approximately one-half of a curvilinear compression member 42.

The modular construction allows the ski carrier system to be formed with a range of carrying capacities. For example, if it is desired to carry four pairs of skis, a central carrying module 34 with three units is used. The same end modules 36 and 38 can be used to complete the pattern. A similar modular construction follows for the upper arm inserts. In the case of the upper arm, however, the inserts comprise a central carrying module 34 with three units, but with only one end module 44 comprising a flat holding member such as illustrated in FIG. 3.

Figure 5:
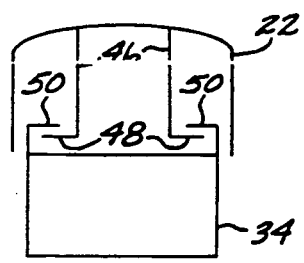
FIG. 5 is a sectional view of an insert illustrated in FIG. 1.
Figure 6:
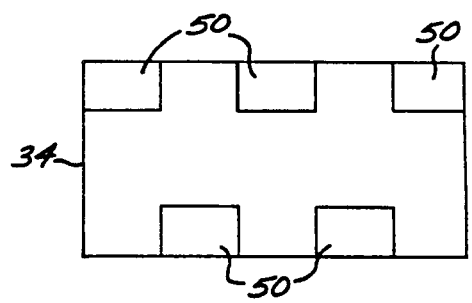
FIG. 6 is a plan view of the insert illustrated in FIG. 5.

The insert modules described above are attached to the arms by means of a rail and tab configuration, as illustrated somewhat schematically in FIGS. 5 and 6. The upper arm 22 is shown in cross-section in FIG. 5, with longitudinally extending walls 46 projecting from its underside. The bottom edges of the walls 46 are provided with a ledge or flange forming a support rail 48. A central carrying module 34 is shown in cross-section in FIG. 5 as having a plurality of projecting tabs 50 that engage with the support rail 48 of the upper arm. Similarly, the lower arm 20 is provided with a ledge forming a support rail. All of the insert modules are provided with the tabs 50. The modular construction allows central modules and end modules to slide on and off the respective arms. This makes production of ski rack systems much easier and more flexible than more complicated attachment systems. Furthermore, ski rack systems purchased by users can be easily expanded or reduced by purchasing different size upper and lower arms.

While the present invention has been described with respect to a preferred embodiment, it is to be understood that variations may occur to those skilled in the art. Other configurations of attaching inserts to the carrier arms, for example, can be provided without departing from the teachings of the present invention. The invention, therefore, should not be seen as limited to the particular system described herein, but it should be understood that the present invention has wide applicability with respect to ski rack systems of different configurations. Such alternate configurations may be achieved by those skilled in the art in view of the description herein.

I claim:

1. A ski carrier system for carrying a plurality of skis on a surface of a vehicle, the ski carrier system comprising:
   a pair of lower arms;
   means for mounting said lower arms above the surface of the vehicle in spaced apart, parallel relationship;
   a pair of upper arms;
   means for releasably fixing each of said upper arms in spaced apart, generally parallel relationship to one of said lower arms to form a pair of carrier frames;
   a plurality of holding members disposed within each of said carrier frames, said holding members arranged as opposed pairs spaced apart to receive and grip opposite surfaces of a pair of skis when the skis are inserted endwise between said holding members, said holding member pairs oriented so that the top surfaces of the skis are angled relative to the vehicle surface; and
   a plurality of compression members disposed within each of said carrier frames, each of said compression members supporting one of said holding members and arranged to urge that holding member toward the opposite holding member of the holding member pair when a pair of skis is inserted between them and to thereby secure the pair of skis therein, the compression members comprising compressible curvilinear sections; and
   the holding members comprise planar segments that are attached at their midpoint to one of the curvilinear sections.

2. A ski carrier system as defined in claim 1, wherein a single compression member and attached holding member comprise an independent modular element of the ski carrier system wherein a plurality of the modular elements can be grouped to hold a plurality of skis.

3. A ski carrier system as defined in claim 1, wherein the compression members are constructed from a neoprene material that retains its compressibility in cold temperatures.

4. A vehicle roof-mounted ski carrier system for carrying a plurality of skis, the ski carrier system comprising:
   a pair of spaced-apart, parallel lower bars;
   support means for mounting the lower bars across the vehicle roof;
   a pair of upper arms, each one releasably attached to one of the lower bars to form a pair of carrier frames; and
   a plurality of carrier elements, each element comprising a curvilinear section and an elongated planar segment attached at its midpoint to the semi-circular section, the plurality of carrier elements arranged in the carrier frame such that the planar segments face each other and define opposed faces between which the skis are longitudinally held.

5. A ski carrier system for carrying a plurality of skis above the roof surface of a vehicle, the ski carrier system comprising:
   first and second lower arms;
   support means for mounting the first and second lower arms above the roof of the vehicle in spaced-apart, parallel relationship;
   first and second upper arms;
   pivot means for releasably fixing the first and second upper arms in spaced apart, generally parallel relationship to the first and second lower arms, respectively, to form a first carrier frame and a second carrier frame;
   a plurality of curvilinear compression members having a flat wall segment and a curved wall segment, the flat wall segments being disposed along the upper and lower arms within the carrier frames; and
   a plurality of planar holding members comprising flat wall segments, wherein a holding member is attached at its midpoint to the curved wall section of each compression member such that the holding members defined opposed pairs spaced apart to receive and grip opposite surfaces of a pair of skis when the skis are inserted endwise between the holding members, the holding member pairs being oriented such that the top surfaces of the skis are angled relative to the vehicle roof;
   wherein the compression members urge their respective holding members toward the opposite holding member when a pair of skis is inserted between the holding members.

* * * * *